(12) United States Patent
Ookubo (10) Patent No.: US 7,702,793 B2
(45) Date of Patent: Apr. 20, 2010

(54) METHOD AND APPARATUS FOR SETTING NETWORK USING DHCP SERVER OR CLIENT FUNCTION

(75) Inventor: Toshikazu Ookubo, Minato-ku (JP)

(73) Assignee: NEC Display Solutions, Ltd., Tokyo (JP)

( * ) Notice: Subject to any disclaimer, the term of this patent is extended or adjusted under 35 U.S.C. 154(b) by 1577 days.

(21) Appl. No.: 10/971,040

(22) Filed: Oct. 25, 2004

(65) Prior Publication Data

US 2005/0108408 A1 May 19, 2005

(30) Foreign Application Priority Data

Oct. 27, 2003 (JP) ............................. 2003-365922

(51) Int. Cl.
*G06F 15/16* (2006.01)
(52) U.S. Cl. ..................................... 709/227
(58) Field of Classification Search ................ 709/205, 709/220–232; 714/4, 6, 13
See application file for complete search history.

(56) References Cited

U.S. PATENT DOCUMENTS

| | | | |
|---|---|---|---|
| 6,286,038 B1* | 9/2001 | Reichmeyer et al. | 709/220 |
| 6,678,732 B1* | 1/2004 | Mouko et al. | 709/227 |
| 6,862,286 B1* | 3/2005 | Tams et al. | 370/401 |
| 6,892,229 B1* | 5/2005 | Karadogan et al. | 709/220 |
| 6,957,276 B1* | 10/2005 | Bahl | 709/245 |
| 7,039,688 B2* | 5/2006 | Matsuda et al. | 709/220 |
| 2002/0010767 A1* | 1/2002 | Farrow et al. | 709/223 |
| 2005/0108431 A1* | 5/2005 | Park | 709/245 |

FOREIGN PATENT DOCUMENTS

| | | |
|---|---|---|
| JP | 2000-174796 A | 6/2000 |
| JP | 2001-036561 A | 2/2001 |
| JP | 2002-009791 A | 1/2002 |
| JP | 2002-164904 A | 6/2002 |
| JP | 2002-217941 A | 8/2002 |
| JP | 2003-143175 A | 5/2003 |

* cited by examiner

*Primary Examiner*—Nathan Flynn
*Assistant Examiner*—Mark O Afolabi
(74) *Attorney, Agent, or Firm*—Sughrue Mion, PLLC (57) ABSTRACT

A PC activates a software program for detecting when a network terminal device is connected to a network, based on the control action of the user. When the network terminal device is connected to the network, the network terminal device sends a connection signal to the PC, and then operates as a DHCP server. Having received the connection signal, the PC recognizes an IP address of the network terminal device that is included in the connection signal, and operates as a DHCP client. The PC makes its own network setting using an IP address assigned from a DHCP server that has the same IP address as the IP address of the network terminal device.

19 Claims, 6 Drawing Sheets

METHOD AND APPARATUS FOR SETTING NETWORK USING DHCP SERVER OR CLIENT FUNCTION

BACKGROUND OF THE INVENTION

1. Field of the Invention

The present invention relates to a terminal device and a network setting method therefor, a service providing device and an operation control method therefor, a network system, and a program.

2. Description of the Related Art

Heretofore, devices that are connected to networks are primarily PCs (Personal Computers).

In recent years, it has become possible to connect service providing devices to networks. A service providing device is a device for providing a certain service to a PC. For example, a service providing device comprises a peripheral device such as a printer, a scanner, a projector, or the like. Therefore, a peripheral device (service providing device) serves as a network terminal device.

In order for a PC to use a service provided by a peripheral device through a network, a network environment needs to be given to the PC and the peripheral device. The network environment includes IP addresses of the PC and the peripheral device.

An IP address is assigned to a device connected to a network mainly by a DHCP (Dynamic Host Configuration Protocol) server (automatic address assigning device).

Heretofore, various DHCP servers have been proposed in the art.

For example, document 1 (Japanese laid-open patent publication No. 2003-143175) discloses a DHCP server that stops an automatic address assigning service if another DHCP service is present on the network.

Document 2 (Japanese laid-open patent publication No. 2002-164904) discloses a DHCP server system having two DHCP servers connected to a network. On the DHCP server system, one of the two DHCP servers performs its DHCP server operation, and the other waits in readiness. When the operating DHCP server suffers a failure, the other comes in and performs its DHCP server operation.

A PC and a peripheral device may not necessarily be connected to a network at all times, but may be highly likely to be given different IP addresses by the DHCP server system disclosed in document 1 or 2 each time they are connected to the network. Therefore, any PCs and peripheral devices that are not connected to the network at all times, find it difficult to accurately recognize at all times an IP address that is assigned to a device with which they are to communicate.

When a user connects the peripheral device to a network, the user has to change the IP address of the peripheral device or the PC, which uses a service provided by the peripheral device, so that the peripheral device and the PC can properly recognize each other's IP addresses.

Some existing peripheral devices assign a network address to a PC with which they are to communicate when they are connected to a network. The network address assigned to the PC by such a peripheral device may differ from one given by an address assigning system of the network, e.g., an IP address assigned to the PC by a DHCP server that is connected to the network.

If the PC uses the IP address assigned thereto by the DHCP server, then the PC is unable to communicate with the peripheral device. Consequently, the user needs to change the IP address of the peripheral device or the IP address of the PC. IP addresses have to be changed each time the peripheral device is connected to the network.

Some existing DHCP servers assign an IP address to only specific network devices. If such a DHCP server is used, then the user has to assign an IP address to a network device to which an IP address has not been assigned by the DHCP server. The user finds it tedious and time-consuming to assign an IP address to the network device when the network device is connected to the network.

Specifically, the user is required to have professional knowledge in order to assign an IP address to a PC or to a peripheral device. In addition, the user may possibly make a mistake by assigning one IP address to a plurality of devices when assigning an IP address to a PC or to a peripheral device.

SUMMARY OF THE INVENTION

It is an object of the present invention to provide a terminal device which is capable of easily changing a network setting and a network setting method therefor, a service providing device and an operation control method therefor, a network system, and a program, for allowing the terminal device to automatically receive a service provided by the service providing device which is connected to a network without the user being required to change network settings.

To achieve the above object, there is provided a terminal device connected to a network, comprising DHCP client function performing means for performing a DHCP client function, receiving means for receiving a signal indicating that a desired service providing device having a DHCP server function is connected to the network, and operation control means for operating the DHCP client function performing means when the receiving means receives the signal.

According to the present invention, when the terminal device receives the signal, the terminal device functions as a DHCP client. Therefore, the terminal device is able to automatically accept an IP address assigned by the service providing device.

Consequently, the user is not required to perform the tedious, time-consuming process of changing the network setting of the terminal device. The terminal device is capable of automatically accepting the service provided by the desired service providing device (a service providing device which provides the service demanded by the terminal device) that is connected to the network.

Preferably, the terminal device comprises indicating means for indicating the desired service providing device that is specified by the user, and the operation control means operates the DHCP client function performing means when the receiving means receives a signal indicating that the service providing device that is indicated by the indicating means is connected to the network. In this case, the terminal device can automatically accept the service that is provided by the service providing device indicated by the user.

The DHCP client function performing means should preferably use an IP address assigned by the desired service providing device as its own IP address. In this case, even if a DHCP server different from the service providing device is connected to the network, the terminal device can use the IP address assigned by the service providing device, not the IP address assigned by the DHCP server, as its own IP address.

The terminal device should preferably be arranged as follows:

The signal includes an IP address of the desired service providing device. The DHCP client function performing means sends a DHCP discover message to the network. The DHCP client function performing means receives a DHCP offer in response to the DHCP discover message. Only if the IP address of a source of the DHCP offer is the same as the IP address included in the signal, the DHCP client function performing means will send a DHCP request to the service providing device having the IP address. The DHCP client function performing means uses an IP address assigned by the service providing device that is based on a response to the DHCP request as its own IP address.

With the above arrangement, the terminal device can confirm a DHCP offer from the service providing device by using a signal indicating that the service providing device is connected to the network.

According to the present invention, there is also provided a service providing device having a DHCP server function and a DHCP client function connected to a network, comprising detecting means for detecting whether a service providing unit that has a DHCP server function and a DHCP client function, for providing the same service as the service of the service providing device, is connected as a DHCP server to the network or not, and operation control means for performing either the DHCP server function or the DHCP client function based on the detected result from the detecting means.

Preferably, the operation control means performs the DHCP client function if the service providing unit is connected to the network as the DHCP server.

With the above arrangement, when the service providing unit operates as a DHCP server, the service providing device can operate as a DHCP client, and when the service providing unit does not operate as a DHCP server, the service providing device can operate as a DHCP server, Therefore, if a plurality of service providing devices which provide the same service are connected to a common network, then the service providing devices can share an IP address assigned by one of the service providing devices. Consequently, a reduction in efficiency that would be caused when each of a plurality of service providing devices assigns an IP address to a common terminal device, is eliminated.

The service providing device should preferably be arranged as follows:

The detecting means detects the activation time of the service providing unit. The operation control means performs either the DHCP server function or the DHCP client function based on the activation time of the service providing device and the activation time of the service providing unit if the service providing unit is not connected to the network as the DHCP server.

Preferably, if the service providing unit is not connected to the network as the DHCP server, the operation control means performs the DHCP server function when the activation time of the service providing device is earlier than the activation time of the service providing unit, and performs the DHCP client function when the activation time of service providing device is not earlier than the activation time of the service providing unit.

With the above arrangement, if a plurality of service providing devices, which provide the same service are connected to the network, then an IP address that is assigned by one of the service providing devices can be shared by the plural service providing devices.

A network system according to the present invention includes the above terminal device and a desired service providing device that is connected to the terminal device through a network. The desired service providing device should preferably be the service providing device according to the present invention.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
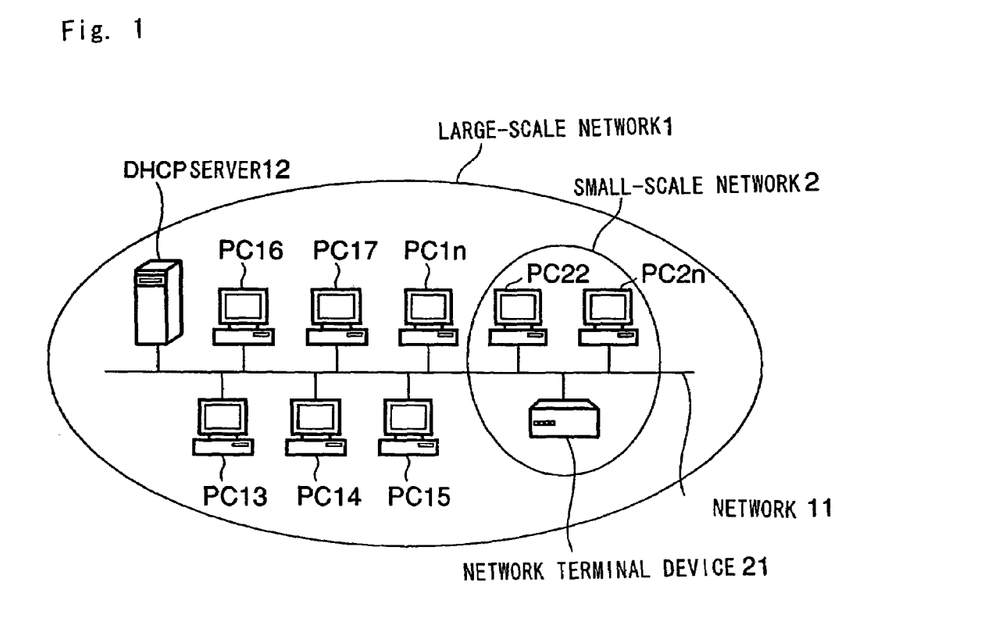
FIG. 1 is a system diagram showing a network system according to the embodiment of the present invention.

FIG. 1 shows a network system according to the embodiment of the present invention.

As shown in FIG. 1, the network system includes PCs 22 through 2n and network terminal device 21. PCs 22 through 2n serve as terminal devices according to the present embodiment, and network terminal device 21 serves as a service providing device according to the present embodiment.

In FIG. 1, the network system has large-scale network 1 including network 11, DHCP server 12, and PCs 13 through 1n, and small-scale network 2 including network terminal device 21 and PCs 22 through 2n. Network terminal device 21 is physically connected to network 11.

Devices that make up large-scale network 1 are connected to each other by network 11 which may be of a wired or wireless structure.

The devices of large-scale network 1, i.e., DHCP server 12 and PCs 13 through 1n, are given respective IP addresses that are constructed by a unique IP address system.

According to the present embodiment, DHCP server 12 manages the IP addresses of the devices of large-scale network 1. Stated otherwise, DHCP server 12 assign IP addresses to PCs 13 through 1n.

Devices of small-scale network 2 are connected to each other by network 11.

Network terminal device 21 assigns IP addresses respectively to the devices of small-scale network 2 according to its own IP address system.

The IP address system for the devices of small-scale network 2 may not necessarily be the same as the IP address system for the devices of large-scale network 1.

Network 11 comprises a TCP/IP network.

DHCP server 12 assigns certain IP addresses to PCs that are connected to network 11 and that operate as DHCP clients. Those certain IP addresses are selected from IP addresses that are managed by DHCP server 12.

Each of PCs 13 through 1n is identical in structure to each of PCs 22 through 2n.

Network terminal device 21 is a network-compatible service providing device, and has a DHCP server and a DHCP client function. Network terminal device 21 provides a certain service to PCs. Network terminal device 21 may comprise a network-compatible peripheral device such as a printer, a scanner, or a projector for use with PCs.

According to the present embodiment, network terminal device 21 may have only a DHCP server function rather than both a DHCP server and a DHCP client function.

Figure 2:
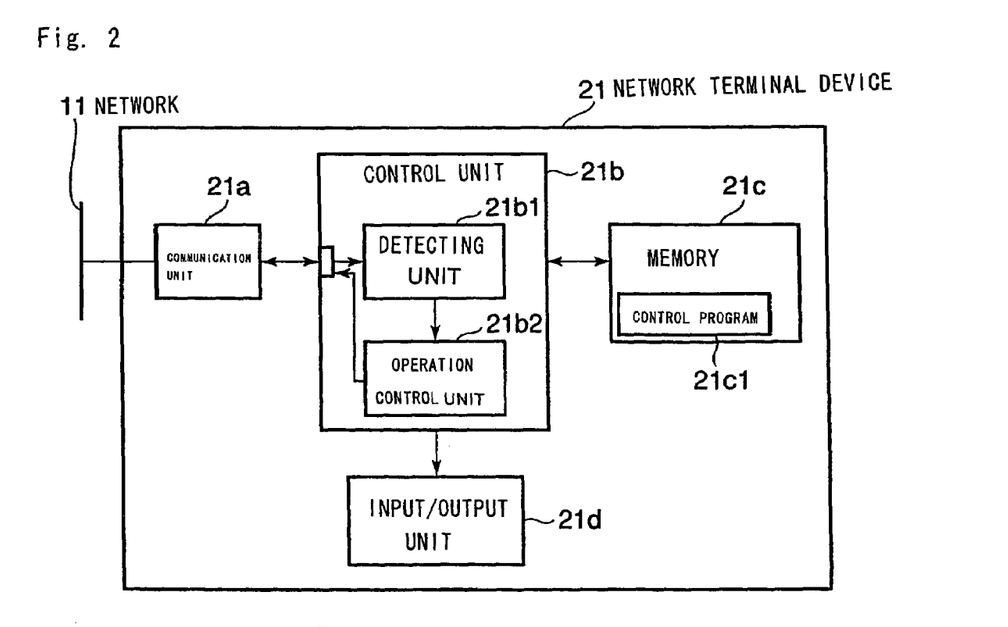
FIG. 2 is a block diagram of a network terminal device according to the embodiment of the present invention.

FIG. 2 shows in block form network terminal device 21. Those parts in FIG. 2 which are identical to those shown in FIG. 1 are denoted by identical reference characters.

In FIG. 2, network terminal device 21 comprises communication unit 21a, control unit 21b, memory 21c, and input/output unit 21d. Control unit 21b includes detecting unit 21b1 and operation control unit 21b2.

Communication unit 21a is connected to network 11, and communicates with other devices connected to network 11 through network 11.

Control unit 21b comprises a CPU as a computer, for example. Control unit 21b executes control program 21c1 stored in memory 21c. Control unit 21b controls network terminal device 21 in its entirety by executing control program 21c1.

For example, when network terminal device 21 is connected to network 11, control unit 21b controls communication unit 21a to output a connection signal to network 11. The connection signal includes network information of network terminal device 21 and identification information for identifying network terminal device 21. The network information of network terminal device 21 includes the IP address of network terminal device 21.

Control unit 21b also manages a plurality of IP addresses to be assigned to devices (e.g., terminal devices) that are connected to network terminal device 21.

Control unit 21b has a detecting function to detect whether a service providing unit different from network terminal device 21 is connected as a DHCP server to network 11. The service providing unit has a DHCP server and a DHCP client function, and provides the same service as the service provided by network terminal device 21.

In FIG. 2, detecting unit 21b1 performs the detecting function of control unit 21b. When control unit 21b executes control program 21c1, detecting unit 21b1 is realized by control unit 21b.

Control unit 21b also has an operation control function to perform either the DHCP server or the DHCP client function based on the detected result from detecting unit 21b1.

In FIG. 2, operation control unit 21b2 performs the operation control function of control unit 21b. When control unit 21b executes control program 21c1, operation control unit 21b2 is realized by control unit 21b.

In FIG. 2, control unit 21b is shown as having only detecting unit 21b1 and operation control unit 21b2. However, the functions of control unit 21b are not limited to the functions of detecting unit 21b1 and the functions of operation control unit 21b2.

For example, control unit 21b operates input/output unit 21d based on a signal supplied through communication unit 21a.

Input/output unit 21d performs the service provided by network terminal device 21. For example, if network terminal device 21 comprises a printer, then input/output unit 21d operates as a printing unit. If network terminal device 21 comprises a scanner, then input/output unit 21d operates as an image input unit.

Figure 3:
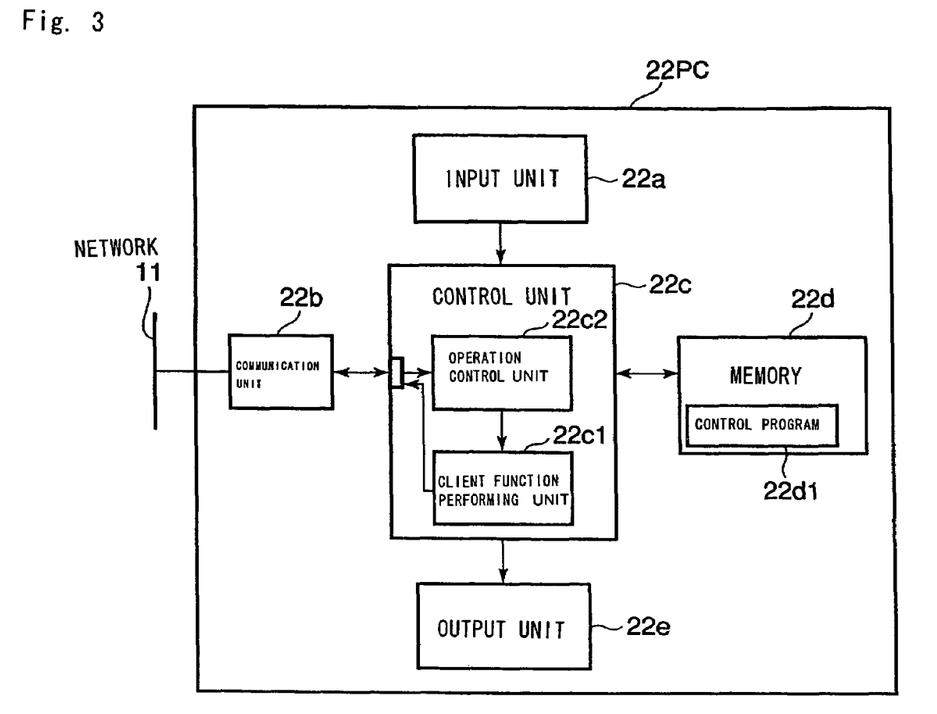
FIG. 3 is a block diagram of a PC according to the embodiment of the present invention.

FIG. 3 shows PC22 in block form.

PCs other than PC22, specifically PC13 through 1n and PC2n, are identical in structure to PC22. Therefore, details of those PCs other than PC22 will not be described below. Those parts in FIG. 3 which are identical to those shown in FIG. 1 are denoted by identical reference characters.

In FIG. 3, PC 22 comprises input unit 22a, communication unit 22b, control unit 22c, memory 22d, and output unit 22e.

Input unit 22a, serving as an indication unit, accepts input from the user. Input unit 22a may be a key input unit, for example.

Input unit 22a accepts indication information indicative of a desired service providing device that has a DHCP server function. Input unit 22a supplies input of the user (e.g., indication information) to control unit 22c. Control unit 22c stores the indication supplied from input unit 22a in memory 22d.

Communication unit 22b, serving as a receiving means, is connected to network 11. Communication unit 22b communicates with other devices connected to network 11 through network 11.

For example, communication unit 22b receives a signal indicating that, a service providing device indicated by input unit 22a, is connected to network 11, e.g., a connection signal output from network terminal device 21 through network 11.

Control unit 22c comprises a CPU as a computer, for example. Control unit 22c executes control program 22d1 stored in memory 22d. Control unit 22c controls PC22 in its entirety by executing control program 22d1.

For example, control unit 22c is capable of performing a DHDP client function.

In FIG. 3, client function performing unit 22c1 performs the DHCP client function of control unit 22c. When control unit 22c executes control program 22d1, client function performing unit 22c1 is realized by control unit 22c.

Control unit 22c also has an operation control function to operate client function performing unit 22c1 when communication unit 22b receives a signal indicating that a service providing device indicated by input unit 22a is connected to network 11.

In FIG. 3, operation control unit 22c2 performs the operation control function of control unit 22c. When control unit 22c executes control program 22d1, operation control unit 22c2 is realized by control unit 22c.

In FIG. 3, control unit 22c is shown as having only client function performing unit 22c1 and operation control unit 22c2. However, the functions of control unit 22c are not limited to the functions of client function performing unit 22c1 and the functions of operation control unit 22c2.

For example, control unit 22c operates output unit 22e based on a signal supplied through communication unit 22b, and also operates output unit 22e based on input from input unit 22a. Output unit 22e may comprise a display unit, for example.

Operation of the network system will be described below with reference to FIGS. 1 through 3.

When input unit 22a accepts an input indicating that the service of network terminal device 21 is to be used, i.e., an input indicative of network terminal device 21, control unit 22c activates a software program (hereinafter referred to as "search software") for detecting when network terminal device 21 is connected to network 11. The search software is stored in memory 22d.

When network terminal device 21 is connected to network 11, network terminal device 21 sends a connection signal to each of the PCs through network 11. Then, network terminal device 21 operates as a DHCP server. The connection signal includes IP address of network terminal device 21.

When PC 22 through 2n receive the connection signal, PC 22 through 2n detect the IP address of network terminal device 21 that is included in the connection signal. Then, PC 22 through 2n operate as DHCP clients.

Specifically, PC 22 through 2n make their own network settings by using the IP address assigned from a DHCP server (specifically, network terminal device 21) which has the same IP address as the IP address of network terminal device 21. As a result, small-scale network 2 is set up.

Figure 4:
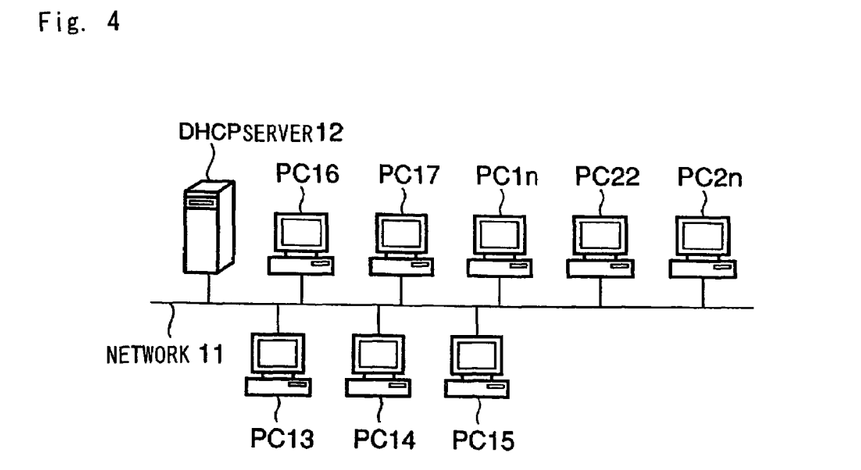
FIG. 4 is a system diagram illustrative of principles of the network system shown in FIG. 1.
Figure 5:
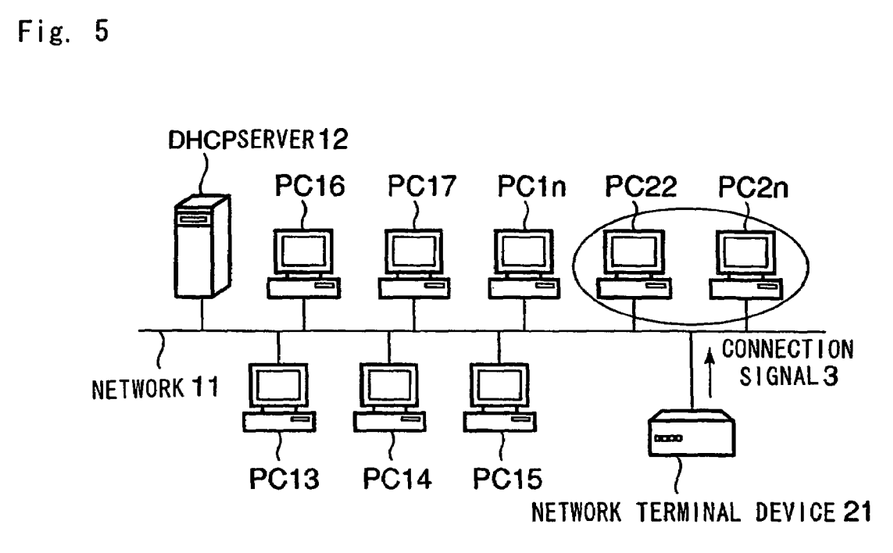
FIG. 5 is a system diagram illustrative of principles of the network system shown in FIG. 1.
Figure 6:
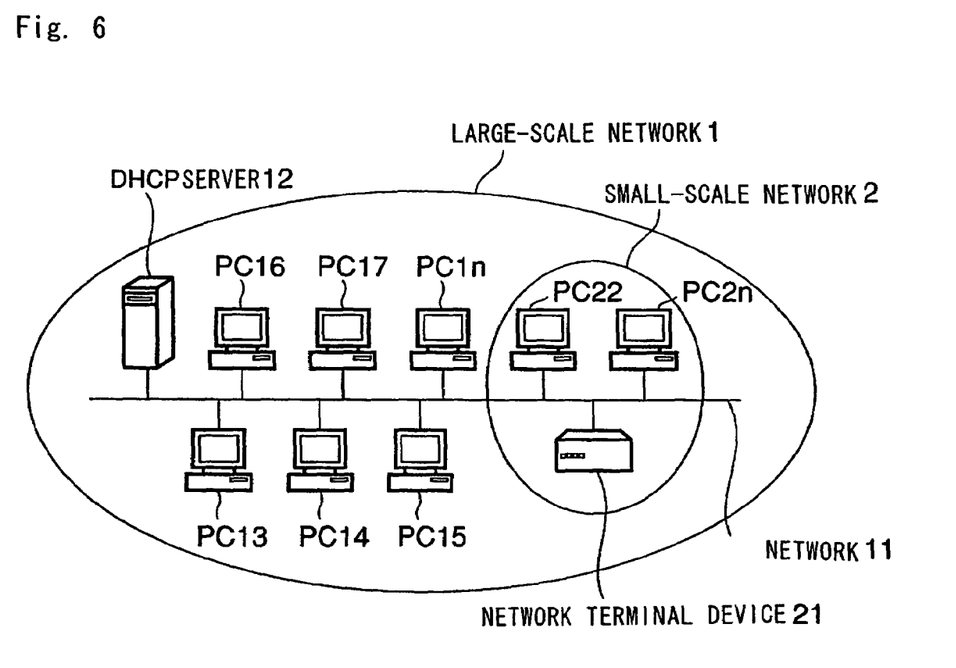
FIG. 6 is a system diagram illustrative of principles of the network system shown in FIG. 1.

FIGS. 4 through 6 show a process for setting up small-scale network 2. Those parts shown in FIGS. 4 through 6 which are identical to those shown in FIG. 1 are denoted by identical reference characters.

FIG. 4 is a system diagram showing a system which differs from the system shown in FIG. 1 in that it is devoid of network terminal device 21.

As shown in FIG. 4, large-scale network 1 includes DHCP server 12 and PCs 13 through 1n and PCs 22 through 2n that are connected to network 11.

In FIG. 4, DHCP server 12 assigns IP addresses of PCs 13 through 1n and PCs 22 through 2n.

FIG. 5 is a system diagram showing a system that includes the system shown in FIG. 4 and network terminal device 21 connected thereto.

As shown in FIG. 5, when network terminal device 21 is connected to the system shown in FIG. 4, network terminal device 21 sends connection signal 3 indicating that network terminal device 21 is connected to network 11 to PCs 13 through 1n and PCs 22 through 2n on the network.

The users of each of PCs 22 through 2n have already made such a setting so that they expect to be connected to network terminal device 21.

FIG. 6 is a system diagram showing a system that includes small-scale network 2 that has been set up. Small-scale network 2 is set up when PCs 22 through 2n are connected to network terminal device 21.

PCs 22 through 2n shown in FIG. 5 are expected to use the function (service) of network terminal device 21. Stated otherwise, PCs 22 through 2n shown in FIG. 5 are expected to be connected to network terminal device 21.

In FIG. 6, when PCs 22 through 2n receive connection signal 3 sent from network terminal device 21, PCs 22 through 2n operate as DHCP clients. Specifically, PCs 22 through 2n acquire respective IP addresses assigned by network terminal device 21 that operates as the DHCP server. Using the acquired IP addresses, PCs 22 through 2n connect themselves to network terminal device 21. As a result, small-scale network 2 is set up.

Figure 7:
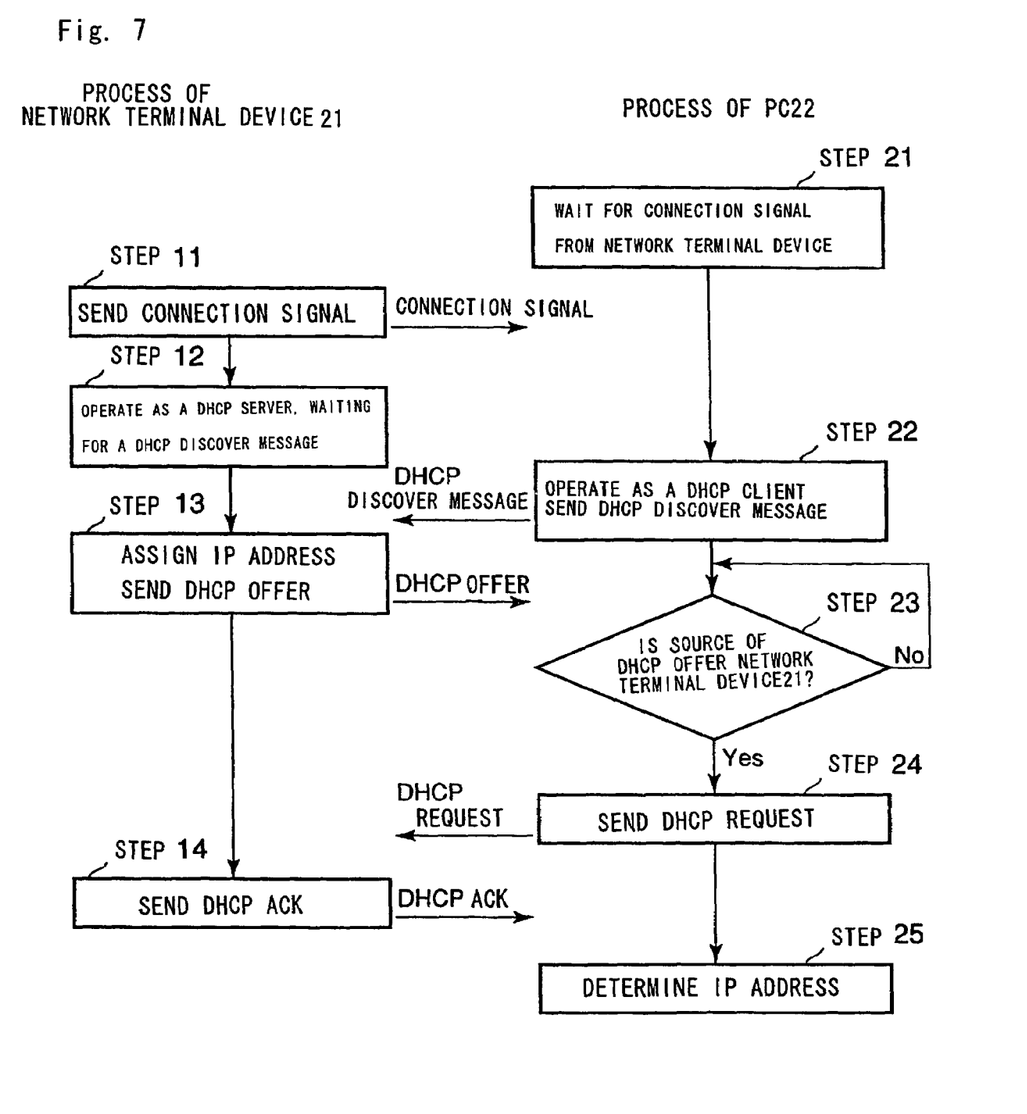
FIG. 7 is a flowchart of the operation sequence of the network system shown in FIG. 1.

FIG. 7 is a flowchart of an operation sequence of the network system shown in FIG. 1. In FIG. 7, operation of network terminal device 21 and PC 22 will mainly be described. Other PCs that are expected to be connected to network terminal device 21 operate in the same manner as PC 22. Operation of control unit 21b will be described below as operation of network terminal device 21, and operation of control unit 22c as operation of PC 22.

Operation of the network system shown in FIG. 1 will be described below with reference to FIG. 7.

In step 21, PC 22 operates as follows:

On PC 22 which is about to use the function of network terminal device 21, when input unit 22a receives an input from the user indicating that the service of network terminal device 21 is to be used, control unit 22c activates the search software for detecting when network terminal device 21 is connected to network 11. Then, PC 22 waits for a connection signal.

In step 11, network terminal device 21 sends a connection signal when it is connected to network 11. Then, network terminal device 21 executes step 12.

In step 12, network terminal device 21 operates as a DHCP server, waiting for a DHCP discover message.

PC 22 receives the connection signal sent from network terminal device 21. When PC 22 receives the connection signal, PC 22 executes step 22. The connection signal includes network information such as an IP address of network terminal device 21 and identification information for identifying network terminal device 21.

In step 22, if the identification information included in the connection signal is representative of network terminal device 21 indicated by the user, then PC 22 starts to operate as a DHCP client. Specifically, PC 22, i.e., client function performing unit 22c1 thereof, sends a DHCP discover message and waits for the DHCP offer.

When network terminal device 21 receives the DHCP discover message, network terminal device 21 executes step 13.

In step 13, network terminal device 21 sends an IP address assigned to PC 22 that has sent the DHCP discover message, that is on a DHCP offer.

PC 22 waits for the DHCP offer sent from network terminal device 21.

However, DHCP server 12 is already present on network 11 to which PC 22 is connected. Therefore, DHCP server 12 is highly likely to send a DHCP offer in response to the DHCP discover message sent from PC 22.

Therefore, PC 22 is highly likely to receive both the DHCP offer sent from network terminal device 21 and the DHCP offer sent from DHCP server 12.

The IP address assigned to PC 22 by network terminal device 21 may possibly differ from the IP address assigned to PC 22 by DHCP server 12. In this case, if PC 22 uses the IP address assigned by DHCP server 12, then PC 22 is unable to connect to network terminal 21.

According to the present embodiment, in step 23, PC 22, i.e., client function performing unit 22c1 thereof, compares the IP address of network terminal device 21 included in the connection signal received in step 22 with the host IP address (source IP address) included in the received DHCP offer.

If the IP address of network terminal device 21 included in the connection signal received in step 22 is the same as the host IP address included in the received DHCP offer in step 23, then PC 22, i.e., client function performing unit 22c1 thereof, executes step 24.

In step 24, PC 22, i.e., client function performing unit 22c1 thereof, judges that the received DHCP offer is a DHCP offer sent from network terminal device 21. PC 22 also judges that the IP address included in the received DHCP offer is the IP address assigned by the network terminal device 21. Thereafter, PC 22, i.e., client function performing unit 22c1 thereof, sends a DHCP request indicating the IP address included in the received DHCP offer as an IP address to be used.

If the IP address of network terminal device 21 included in the connection signal received in step 22 is different from the host IP address included in the received DHCP offer in step 23, then PC 22, i.e., client function performing unit 22c1 thereof, judges that the received DHCP offer is a DHCP offer from DHCP server 12, i.e., the received DHCP offer is not a DHCP offer from network terminal device 21. Then, control goes back to step 23.

When network terminal device 21 receives the DHCP request sent from PC 22, network terminal device 21 executes step 14.

In step 14, network terminal device 21 returns the DHCP acknowledgment message to PC 22.

When PC 22 receives the DHCP acknowledgment message, PC 22 executes step 25.

In step 25, PC 22, i.e., client function performing unit 22c1 thereof, finally determines the IP address of PC 22 as the IP address indicated by the DHCP offer sent from network terminal device 21.

According to the present embodiment, when the PC receives a signal (connection signal) indicating that the network terminal device, e.g., the network terminal device indicated by the user, is connected to network 11, the PC functions as a DHCP client. Therefore, the PC is able to automatically accept an IP address assigned by the network terminal device that functions as the DHCP server.

Furthermore, according to the present embodiment, network terminal device 21 sends connection signal 3 including its own network information. PC 22 which requests the service provided by network terminal device 21 determines whether the DHCP offer is a DHCP offer from network terminal device 21 by using the connection signal sent from network terminal device 21. Consequently, a network setting, which allows PC 22 and network terminal device 21 to be connected to each other, is automatically made.

Even if network terminal device 21 is not connected to network 11 at all times, a network setting which allows PC 22 and network terminal device 21 to be connected to each other is automatically made each time network terminal device 21 is connected to network 11.

Therefore, the user is not required to perform the tedious, time-consuming process of changing the network setting of network terminal device 21 each time network terminal device 21 is connected to network 11.

Another embodiment of the present invention will be described below.

Figure 8:
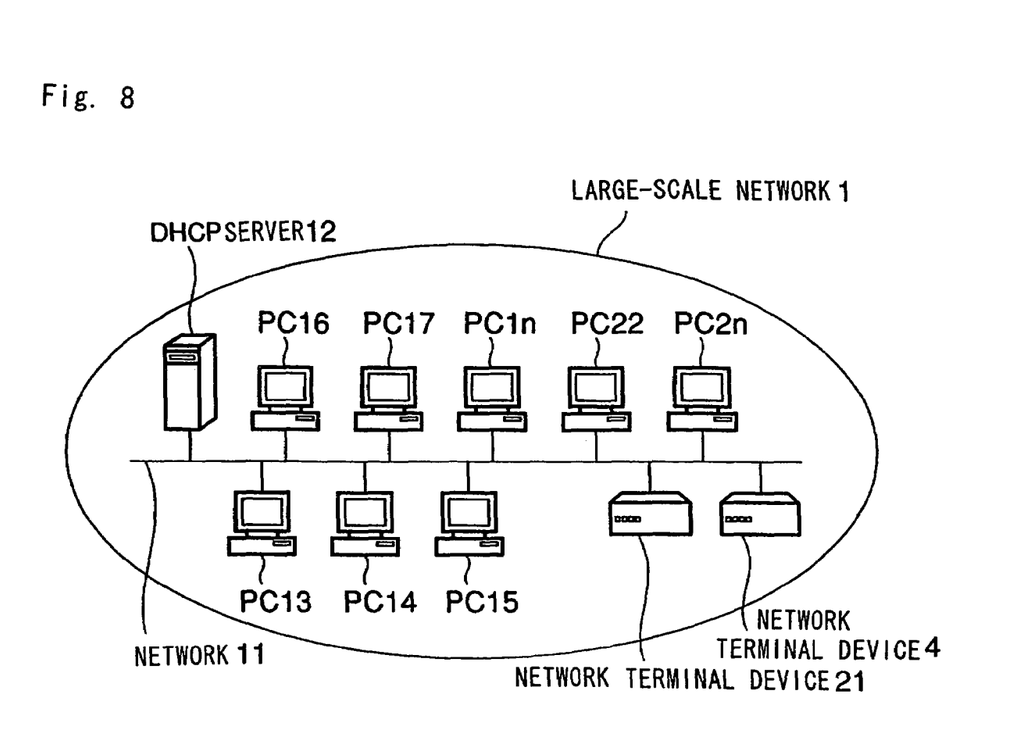
FIG. 8 is a system diagram showing a network system according to another embodiment of the present invention.

FIG. 8 shows a network system according to another embodiment of the present invention, in which network terminal device 4 is connected to the network system shown in FIG. 1. Those parts in FIG. 8 which are identical to those shown in FIG. 1 are denoted by identical reference characters.

Network terminal device 4 has the same function as network terminal device 21. Network terminal device 4 provides the same service as the service of network terminal device 21.

In FIG. 8, PCs 22 through 2n use the services of both network terminal device 21 and network terminal device 4. When network terminal device 21, network terminal device 4, and PC 22 through 2n perform the operation sequence shown in FIG. 7, both network terminal device 21 and network terminal device 4 assign IP addresses to PC 22 through 2n.

For example, each time PC 22 through 2n switch between a mode for receiving the service provided by network terminal device 21 and a mode for receiving the service provided by network terminal device 4, the operation sequence shown in FIG. 7 is repeated. Therefore, the network system shown in FIG. 8 makes itself less efficient in operation.

According to the present embodiment, if a plurality of network terminal devices, or specifically, if a plurality of service providing devices each having a DHCP server function, are present on a network, then only one of them is used as a service providing device for assigning IP addresses.

Figure 9:
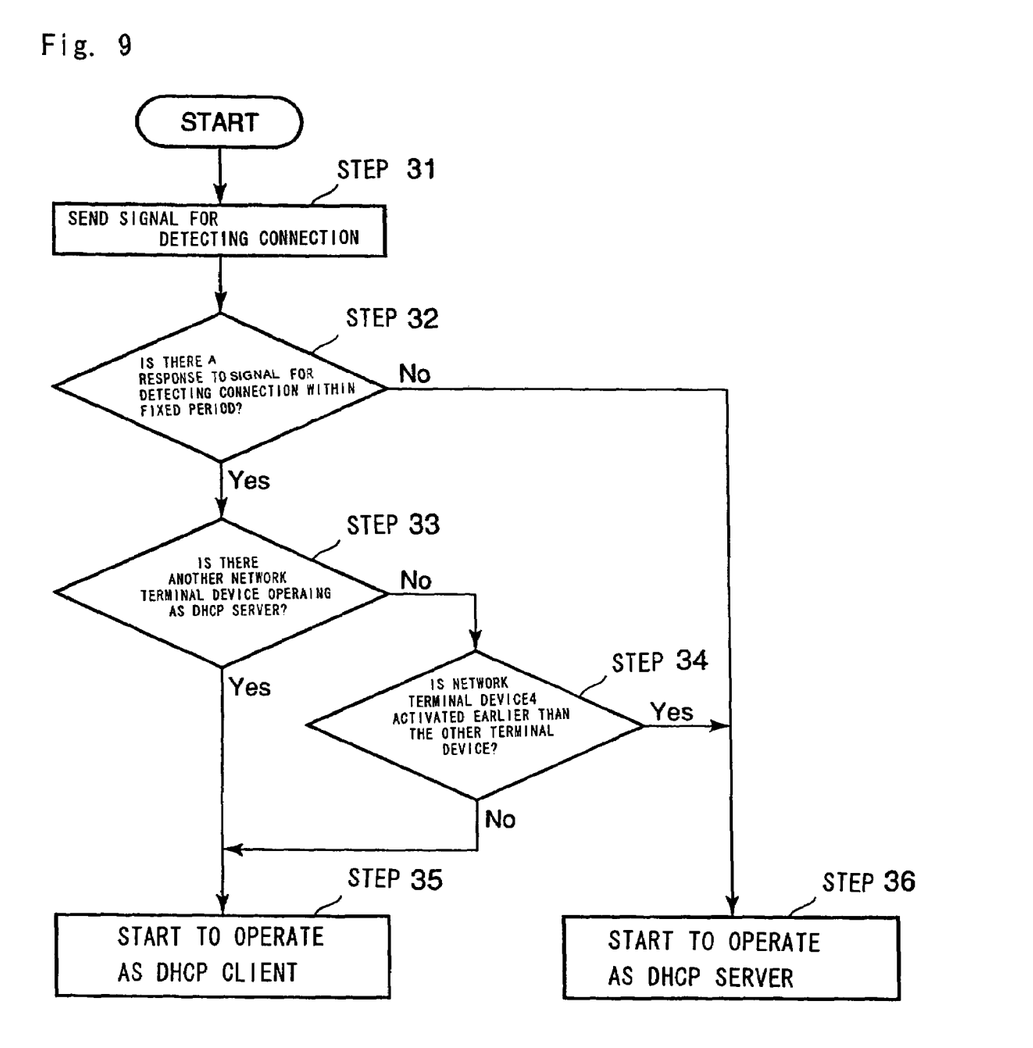
FIG. 9 is a flowchart of the operation sequence of a network terminal device in the network system shown in FIG. 8.

FIG. 9 shows the operation sequence of a service providing device having a DHCP server function, i.e., an operation sequence of network terminal device 4 in the network system shown in FIG. 8. Operation of control unit 21b of network terminal device 4 will be described below as operation of network terminal device 4.

When network terminal device 4 is connected to network 11, network terminal device 4 executes step 31.

In step 31, network terminal device 4, i.e., detecting unit 21b1 thereof, sends a signal for detecting connection. The signal for detecting connection is a signal for detecting an operation status indicative of whether another terminal device (service providing device) connected to network 11 is operating as a DHCP server. The signal for detecting connection is also a signal for detecting the activation time of another such terminal device.

After step 31, network terminal device 4 executes step 32.

In step 32, network terminal device 4 waits for a response to the signal for detecting connection.

The response to the signal for detecting connection includes information indicative of whether another terminal device is operating as a DHCP server and also information as to the activation time of another such terminal device.

If there is no response to the signal for detecting connection within a fixed period of time from the transmission of the signal for detecting connection in step 32, then network terminal device 4 executes step 36.

In step 36, network terminal device 4 judges that there is no other network terminal device (service providing device). Thereafter, network terminal device 4 starts operating as a DHCP server. Specifically, network terminal device 4 carries out the processing in steps 11 through 14 shown in FIG. 7.

If there is a response to the signal for detecting connection in step 32, detecting unit 21b1 accepts the response, and network terminal device 4 executes step 33. In step 33, network terminal device 4, i.e., operation control unit 21b2 thereof, confirms whether there is another network terminal device (service providing device) operating as a DHCP server, based on the content of the response to the signal for detecting the connection.

If there is another network terminal device operating as a DHCP server, then network terminal device 4 executes step 35.

In step 35, network terminal device 4, i.e., operation control unit 21b2 thereof, starts operating as a DHCP client. Specifically, network terminal device 4, i.e., operation control unit 21b2 thereof, sends a DHCP discover message. Thereafter, network terminal device 4, i.e., operation control unit 21b2 thereof, receives an IP address assigned by the other terminal device operating as a DHCP server. Subsequently, network terminal device 4, i.e., operation control unit 21b2 thereof, finally determines the received IP address as its own IP address.

If there is another network terminal device (service providing device), but it is not a DHCP server, then network terminal device 4 executes step 34.

In step 34, network terminal device 4, i.e., operation control unit 21b2 thereof, determines whether network terminal device 4 is to operate as a DHCP server or as a DHCP client, based on the activation times of the other network terminal device and network terminal device 4 itself.

For example, if network terminal device 4 is activated earlier than the other terminal device, then network terminal device 4, i.e., operation control unit 21b2 thereof, executes step 36. Therefore, network terminal device 4 starts operating as a DHCP server. If network terminal device 4 is not activated earlier than the other terminal device, then network terminal device 4, i.e., operation control unit 21b2 thereof, executes step 35. Therefore, network terminal device 4 starts operating as a DHCP client.

Therefore, if a plurality of service providing devices which provide the same service are connected to the network, one of the service providing devices, which is determined based on the activation time, operates as a DHCP server. Consequently, an IP address assigned by the determined service providing device can be shared by the plural service providing devices.

According to the present embodiment, if the service providing unit providing the same service operates as a DHCP server, the service providing device operates as a DHCP client, and if the service providing unit does not operate as a DHCP server, the service providing device operates as a DHCP server.

Therefore, if a plurality of service providing devices which provide the same service are connected to the network, then an IP address assigned by one of the service providing devices can be shared by the plural service providing devices. Consequently, a reduction in efficiency, that would be caused when each of a plurality of service providing devices assigns an IP address to a common terminal device, is eliminated.

The connection signal that is produced by network terminal device 21 or network terminal device 4 may be sent at any desired time, e.g., a time indicated by the user.

While preferred embodiments of the present invention have been described using specific terms, such description is for illustrative purposes only, and it is to be understood that changes and variations may be made without departing from the spirit or scope of the following claims.

What is claimed is:

1. A terminal device connected to a network being served by a first device having a DHCP server function, comprising:
   means for performing a DHCP client function;
   receiving means for receiving a signal indicating that a second device having a DHCP server function is connected to said network, the second device providing a service desired by the terminal device; and
   operation control means for operating said means for performing a DHCP client function when said receiving means receives said signal,
   wherein said DHCP client function comprises a function for using an IP address assigned by said second device as its own IP address, and
   wherein the IP address assigned by said second device is different from the IP address assigned by said first device having a DHCP server function.

2. A terminal device according to claim 1, further comprising:
   indicating means for indicating the desired service providing device specified by the user;
   wherein said operation control means operates said means for performing a DHCP client function when said receiving means receives a signal indicating that the service providing device indicated by said indicating means is connected to said network.

3. A terminal device according to claim 1, wherein said means for performing a DHCP client function uses an IP address assigned by said desired service providing device as its own IP address.

4. A terminal device according to claim 3, wherein said signal includes an IP address of said desired service providing device, and wherein said means for performing a DHCP client function sends a DHCP discover message to said network, and when said means for performing a DHCP client function receives an DHCP offer in response to said DHCP discover message, and only if an IP address of a source of said DHCP offer is the same as the IP address included in said signal, said means for performing a DHCP client function sends a DHCP request to the service providing device having said IP address, and said means for performing a DHCP client function uses an IP address assigned by said service providing device based on a response to said DHCP request as its own IP address.

5. A first service providing device having a DHCP server function and a DHCP client function and connected to a network, comprising:
   detecting means for detecting whether, a second service providing unit device having a DHCP server function and a DHCP client function, for providing the same service as the service provided by the first service providing device, is connected as a DHCP server to said network; and
   operation control means for performing selectively the DHCP server function and the DHCP client function based on a detected result from said detecting means.

6. A first service providing device according to claim 5, wherein said operation control means performs said DHCP client function if said second service providing device is connected as the DHCP server to said network.

7. A first service providing device according to claim 5, wherein said detecting means detects an activation time of said second service providing device, and said operation control means selectively performs the DHCP server function and the DHCP client function based on an activation time of the first service providing device and the activation time of said second service providing device if said second service providing device is not connected as the DHCP server to said network.

8. A first service providing device according to claim 7, wherein if said second service providing device is not connected as the DHCP server to said network, said operation control means performs the DHCP server function when the activation time of the service providing device is earlier than the activation time of said second service providing device, and performs the DHCP client function when the activation time of the first service providing device is not earlier than the activation time of said second service providing device.

9. A network system comprising:
   a terminal device according to claim 1; and
   a desired service providing device connected to said terminal device through said network.

10. A network system according to claim 9, wherein said desired service providing device comprises a first service providing device having a DHCP server function and a DHCP client function and connected to a network, comprising:
    detecting means for detecting whether, a second service providing device having a DHCP server function and a DHCP client function, for providing the same service as the service provided by the first service providing device, is connected as a DHCP server to said network; and
    operation control means for performing selectively the DHCP server function and the DHCP client function based on a detected result from said detecting means.

11. A network setting method to be carried out by a terminal device having a DHCP client function and connected to a network being served by a first device having a DHCP server function, the method comprising:
    receiving a signal indicating that second device having a DHCP server function is connected to said network, the second device providing a service desired by the terminal device; and
    performing the DHCP client function when said signal is received,
    wherein said DHCP client function comprises a function for using an IP address assigned by said second device as its own IP address, and
    wherein the IP address assigned by said second device is different from the IP address assigned by said first device having a DHCP server function.

12. A network setting method according to claim 11, further comprising the step of:
   indicating the desired service providing device specified by a user;
   wherein said performing step comprises performing said DHCP client function when a signal that indicates that the service providing device indicated in said indicating step is connected to said network is received.

13. A network setting method according to claim 11, wherein said signal includes an IP address of said desired service providing device, said DHCP client function executes DHCP client operation comprising the steps of:
   sending a DHCP discover message to said network;
   when a DHCP offer in response to said DHCP discover message is received, and only if an IP address of a source of said DHCP offer is the same as the IP address included in said signal, sending a DHCP request to the service providing device having said IP address; and
   using an IP address assigned by said service providing device based on a response to said DHCP request as its own IP address.

14. An operation control method carried out by a service providing device having a DHCP server function and a DHCP client function and connected to a network, comprising the steps of:
   detecting whether a service providing unit having a DHCP server function and a DHCP client function, for providing the same service as the service provided by the service providing device, is connected as a DHCP server to said network; and
   selectively performing the DHCP server function and the DHCP client function based on a detected result from said detecting step,
   wherein the service provided by the service providing device is a service other than DHCP server.

15. An operation control method according to claim 14, wherein the performing step comprises performing said DHCP client function if said service providing unit is connected as the DHCP server to said network.

16. An operation control method according to claim 14, wherein said detecting step comprises detecting an activation time of said service providing unit, and said performing step comprises selectively performing the DHCP server function and the DHCP client function based on an activation time of service providing device and the activation time of said service providing unit if said service providing unit is not connected as the DHCP server to said network.

17. An operation control method according to claim 16, wherein if said service providing unit is not connected as the DHCP server to said network, said performing step comprises the steps of performing the DHCP server function when the activation time of the service providing device is earlier than the activation time of said service providing unit, and performing the DHCP client function when the activation time of the service providing device is not earlier than the activation time of said service providing unit.

18. A computer program product having computer instructions recorded on a computer readable memory, for enabling a computer executing the computer instructions to carry out a network setting method according to claim 11.

19. A computer program product having computer instructions recorded on a computer readable memory, for enabling a computer executing the computer instructions to carry out an operation control method according to claim 14.

* * * * *